United States Patent
Ahn et al.

(10) Patent No.: US 10,396,345 B2
(45) Date of Patent: Aug. 27, 2019

(54) APPARATUS AND METHOD FOR MANUFACTURING ELECTRODE

(71) Applicant: LG CHEM, LTD., Seoul (KR)

(72) Inventors: Se Young Ahn, Daejeon (KR); Jin Woo Choi, Daejeon (KR); Sang Ho Bae, Daejeon (KR); Sang Baek Ryu, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 15/758,086

(22) PCT Filed: Mar. 13, 2017

(86) PCT No.: PCT/KR2017/002664
§ 371 (c)(1),
(2) Date: Mar. 7, 2018

(87) PCT Pub. No.: WO2017/217640
PCT Pub. Date: Dec. 21, 2017

(65) Prior Publication Data
US 2018/0254472 A1    Sep. 6, 2018

(30) Foreign Application Priority Data
Jun. 13, 2016 (KR) .................. 10-2016-0073180

(51) Int. Cl.
*H01M 4/04* (2006.01)
*H01M 4/139* (2010.01)
(Continued)

(52) U.S. Cl.
CPC ........... *H01M 4/0404* (2013.01); *H01M 4/04* (2013.01); *H01M 4/139* (2013.01);
(Continued)

(58) Field of Classification Search
CPC ...... H01M 4/04; H01M 4/0404; H01M 4/139; H01M 10/0404; B05D 1/26; B05D 3/12; B05D 5/12
(Continued)

(56) References Cited

U.S. PATENT DOCUMENTS

| | | |
|---|---|---|
| 2009/0148768 A1 | 6/2009 | Tazoe |
| 2010/0024203 A1 | 2/2010 | Kim et al. |
| 2010/0112453 A1 | 5/2010 | Gutsch et al. |
| 2011/0277287 A1 | 11/2011 | Tazoe |
| 2011/0281158 A1 | 11/2011 | Tazoe |

(Continued)

FOREIGN PATENT DOCUMENTS

| | | |
|---|---|---|
| EP | 1 722 426 A1 | 11/2006 |
| JP | 2014-137944 A | 7/2014 |

(Continued)

OTHER PUBLICATIONS

European Search Report for Appl. No. 17813465.6 dated Jul. 6, 2018.
(Continued)

*Primary Examiner* — Brian K Talbot
(74) *Attorney, Agent, or Firm* — Birch, Stewart, Kolasch & Birch, LLP

(57) ABSTRACT

The present invention relates an apparatus and method for manufacturing an electrode, and more particularly, to an apparatus and method for manufacturing an electrode, which is capable of improving productivity of the electrode in comparison with the related art. According to an aspect of the present invention so at to achieve the above object, a method for manufacturing an electrode includes: a step of preparing a collector; a coating step of applying an electrode active material to one surface or both surfaces of the collector to manufacture an initial electrode; and a first cutting step of cutting the initial electrode coated with the
(Continued)

electrode active material to manufacture a plurality of middle-stage electrodes, wherein, in the first cutting step, the initial electrode is cut so that at least one of the plurality of middle-stage electrodes has a length different from those of the other middle-stage electrodes.

6 Claims, 5 Drawing Sheets

(51) Int. Cl.
    *H01M 10/04*     (2006.01)
    *B05D 1/26*     (2006.01)
    *B05D 3/12*     (2006.01)
    *B05D 5/12*     (2006.01)

(52) U.S. Cl.
    CPC ........... *H01M 10/0404* (2013.01); *B05D 1/26* (2013.01); *B05D 3/12* (2013.01); *B05D 5/12* (2013.01)

(58) Field of Classification Search
    USPC .................................................. 427/58, 115
    See application file for complete search history.

(56) References Cited

U.S. PATENT DOCUMENTS

| | | | |
|---|---|---|---|
| 2011/0293996 A1* | 12/2011 | Daidoji | H01M 2/22 429/158 |
| 2013/0122347 A1* | 5/2013 | Horikawa | H01G 11/12 429/144 |
| 2013/0143088 A1* | 6/2013 | Cho | H01M 2/1653 429/94 |
| 2016/0359189 A1* | 12/2016 | Fukatsu | H01M 4/133 |

FOREIGN PATENT DOCUMENTS

| | | |
|---|---|---|
| KR | 10-2006-0129349 A | 12/2006 |
| KR | 10-2012-0076850 A | 7/2012 |
| KR | 10-2013-0091133 A | 8/2013 |
| KR | 10-2014-0070260 A | 6/2014 |

OTHER PUBLICATIONS

International Search Report for PCT/KR2017/002664 (PCT/ISA/210) dated Jun. 13, 2017.

* cited by examiner

US 10,396,345 B2

APPARATUS AND METHOD FOR MANUFACTURING ELECTRODE

CROSS-REFERENCE TO RELATED APPLICATION

The present application claims the benefit of the priority of Korean Patent Application No. 10-2016-0073180, filed on Jun. 13, 2016, which is hereby incorporated by reference in its entirety.

TECHNICAL FIELD

The present invention relates an apparatus and method for manufacturing an electrode, and more particularly, to an apparatus and method for manufacturing an electrode, which is capable of improving productivity of the electrode in comparison with the related art.

BACKGROUND ART

As a device, on which a secondary battery is mounted, and a shape of the device are varied, a shape required for an electrode assembly constituting the secondary battery is also becoming various. To meet such a trend, studies for developing the electrode assembly having various shapes have been actively conducted.

There are various methods for manufacturing the electrode assembly having various shapes, but as one example, there is a method for manufacturing an electrode assembly having a stepped portion by stacking electrode units having different areas. This is a method for manufacturing an electrode assembly, in which an electrode unit including an electrode and a separator is manufactured. Here, various kinds of electrode units having different areas and separators are manufactured and then stacked to manufacture the electrode assembly having the stepped portion. To manufacture the electrode assembly through the above-described method, it is necessary to manufacture electrodes having different areas.

FIG. 1 is a view illustrating a method for manufacturing an electrode having a first length a according to the related art, and FIG. 2 is a view illustrating a method for manufacturing an electrode having a second length b according to the related art.

Referring to FIGS. 1 and 2, prior to the manufacturing of electrodes having lengths (i.e., areas) different from each other, an initial electrode 1 is manufactured by applying an electrode active material 3 to a collector 2. FIGS. 1 and 2 illustrate a process of manufacturing two initial electrodes so as to manufacture two kinds of electrodes. Here, the initial electrode 1 includes a coating portion 4 that is an area coated with an electrode active material 3 and a non-coating portion 5 that is an area which is not coated with the electrode active material 3.

Thereafter, the initial electrodes 1 are cut along cutting lines 6 to manufacture electrodes having the same length. Here, to manufacture the electrodes having different lengths, the initial electrodes are manufactured with different lengths. FIGS. 1 and 2 illustrate a process of manufacturing electrodes having lengths a and b by cutting the initial electrodes 1.

However, according to the related art, since the electrodes having different areas are respectively manufactured through different processes, productivity may be deteriorated. That is, for example, when two kinds of electrodes having different areas are required, there is a problem in that the productivity of the electrodes is deteriorated because two processes are also required to manufacture the electrodes. Also, to manufacture the electrodes having different areas, there is a problem in that equipment and costs required for production of the electrodes also increase due to different processes.

DISCLOSURE OF THE INVENTION

Technical Problem

Therefore, an object of the present invention is to improve productivity of electrodes by manufacturing the electrodes having different areas through one process and reduce equipment and costs required for production of the electrodes.

Technical Solution

According to an aspect of the present invention so at to achieve the above object, a method for manufacturing an electrode includes: a step of preparing a collector; a coating step of applying an electrode active material to one surface or both surfaces of the collector to manufacture an initial electrode; and a first cutting step of cutting the initial electrode coated with the electrode active material to manufacture a plurality of middle-stage electrodes, wherein, in the first cutting step, the initial electrode is cut so that at least one of the plurality of middle-stage electrodes has a length different from those of the other middle-stage electrodes.

Each of the middle-stage electrodes may include a coating portion that is an area coated with the electrode active material and a non-coating portion that is an area which is not coated with the electrode active material, and the coating portions may be spaced apart from each other.

The coating portion within the middle-stage electrodes may have the same length.

The plurality of middle-stage electrodes may be divided into two or more groups according to lengths of the coating portions, and the coating portions of the middle-stage electrodes of the groups may have lengths different from each other.

In the coating step, the electrode active material may be applied so that the initial electrode includes the non-coating portion that is the area which is not coated with the electrode active material and the coating portions that are areas coated with the electrode active material and spaced apart from each other, and the electrode active material may be applied so that the coating portions having the same length are repeatedly disposed.

The method may further include a second cutting step of cutting the middle-stage electrode to manufacture a final electrode.

A cutting direction in the first cutting step may be perpendicular to that in the second cutting step.

In the second cutting step, a portion of the non-coating portion of the middle-stage electrode may be cut so that the final electrode includes an electrode tab.

According to another aspect of the present invention so at to achieve the above object, an apparatus for manufacturing an electrode includes: a coating unit for applying an electrode active material to one surface or both surfaces of a collector to manufacture an initial electrode; and a first cutting unit for cutting the initial electrode coated with the electrode active material to manufacture a plurality of middle-stage electrodes, wherein, in the first cutting unit, the initial electrode is cut so that at least one of the plurality of middle-stage electrodes has a length different from those of the other middle-stage electrodes.

Each of the middle-stage electrode may include a coating portion that is an area coated with the electrode active material and a non-coating portion that is an area which is not coated with the electrode active material, wherein the coating portions may be spaced apart from each other.

The coating portions within the middle-stage electrode may have the same length.

The plurality of middle-stage electrodes may be divided into two or more groups according to lengths of the coating portions, and the coating portions of the middle-stage electrode of the groups may have lengths different from each other.

In the coating unit, the electrode active material may be applied so that the initial electrode includes the non-coating portion that is the area which is not coated with the electrode active material and the coating portions that are areas coated with the electrode active material and spaced apart from each other, and the electrode active material may be applied so that the coating portions having the same length are repeatedly disposed.

The apparatus may further include a second cutting unit of cutting the middle-stage electrode to manufacture a final electrode.

A cutting direction of the first cutting unit may be perpendicular to that of the second cutting unit.

In the second cutting unit, a portion of the non-coating portion of the middle-stage electrode may be cut so that the final electrode includes an electrode tab.

Advantageous Effects

According to the present invention, since the electrodes having different areas are manufactured through one process, the productivity of the electrodes may be improved, and also, the equipment and costs required for the production of the electrodes may be reduced.

MODE FOR CARRYING OUT THE INVENTION

Hereinafter, an apparatus and method for manufacturing an electrode according to an embodiment and another embodiment of the present invention will be described with reference to the accompanying drawings.

Method for Manufacturing Electrode

Figure 1:
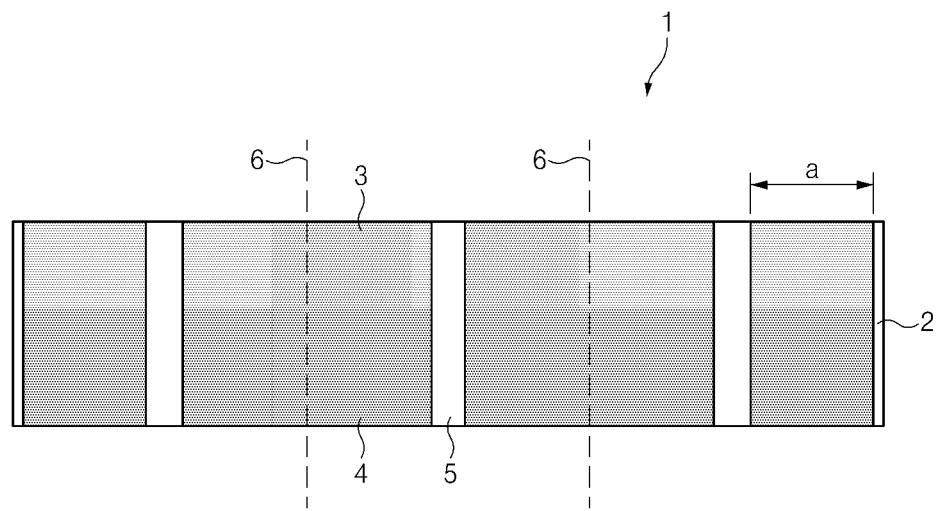
FIG. 1 is a plan view illustrating a method for manufacturing an electrode having a first length according to a related art.
Figure 2:
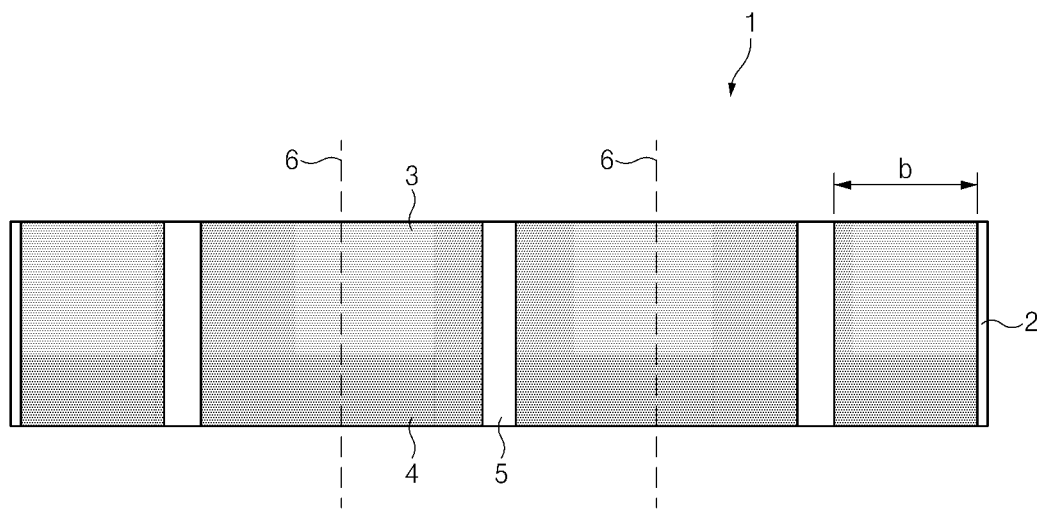
FIG. 2 is a plan view illustrating a method for manufacturing an electrode having a second length according to the related art.
Figure 3:
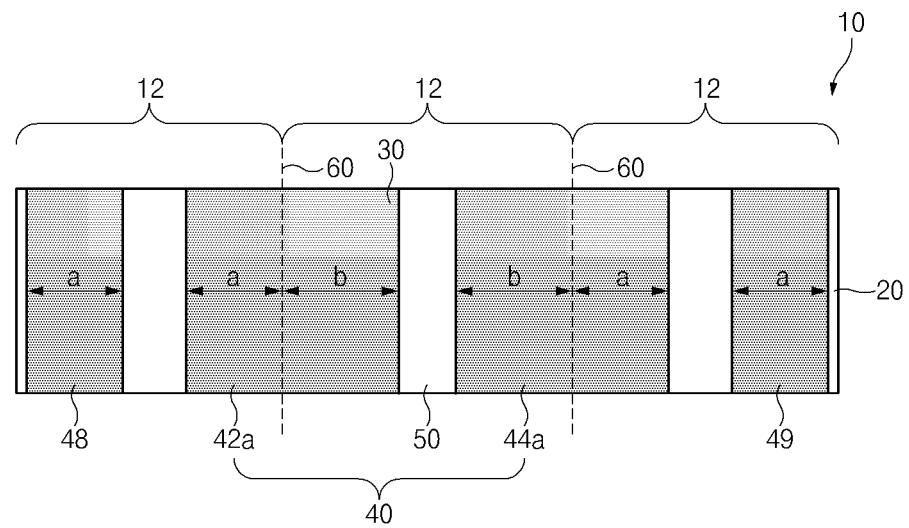
FIG. 3 is a plan view for explaining a coating step and a first cutting step in a method for manufacturing an electrode according to an embodiment of the present invention.

FIG. 3 is a view for explaining a coating step and a first cutting step in a method for manufacturing an electrode according to an embodiment of the present invention.

A method for manufacturing an electrode according to the present invention includes a step of preparing a collector 20 coated with an active material.

When the collector 20 is prepared, a coating step of applying an electrode active material 30 to the collector 20 is performed. In the coating step, the electrode active material 30 may be applied on one surface or both surfaces of the collector 20. An initial electrode 10 is primarily manufactured through the coating step.

Here, in the coating step, the electrode active material may be applied to the collector so that the initial electrode 10 includes a coating portion that is an area coated with the electrode active material and a non-coating portion that is an area which is not coated with the electrode active material. The electrode active material may be a positive electrode or a negative electrode.

That is, referring to FIG. 3, in the coating step, the initial electrode may include the non-coating portion 50 that is an area which is not coated with the electrode active material 30. Thus, the electrode active material 30 may be applied to the collector 20 so that the coating portions 40 that are areas coated with the electrode active material 30 are spaced apart from each other by the non-coating portion 50.

Also, in the coating step, the electrode active material 30 may be applied to the collector 20 so that the coating portions 40 have the same length. Alternatively, the electrode active material 30 may be applied to the collector so that the coating portions 40 are repeatedly formed. That is, in the coating step, the electrode active material 30 may be applied to the collector 20 so that the coating portions 40 having the same length are repeatedly formed. FIG. 3 illustrates a case in which the electrode active material 30 is repeatedly applied to the collector 20 so that the coating portion 40 has a length of a+b. Here, a and b may be different values.

In this specification, 'applying the electrode active material to the collector so that the coating portions having the same length are repeatedly formed' means that the coating portions having the same length are repeatedly formed on at least a portion of the collector and does not mean that only the coating portions having the same length are formed on the collector. FIG. 3 illustrates an example of a case in which the coating portions 42a and 44a (i.e., a first coating portion and a second coating portion), each of which has a length of a+b, are repeatedly formed on the collector 20 with the non-coating portion 50 therebetween.

Here, the 'length' described above does not mean that a length of the coating portion in a longitudinal direction, but means a length of the coating portion in a direction in which the electrode active material is applied in the coating step.

Figure 4:
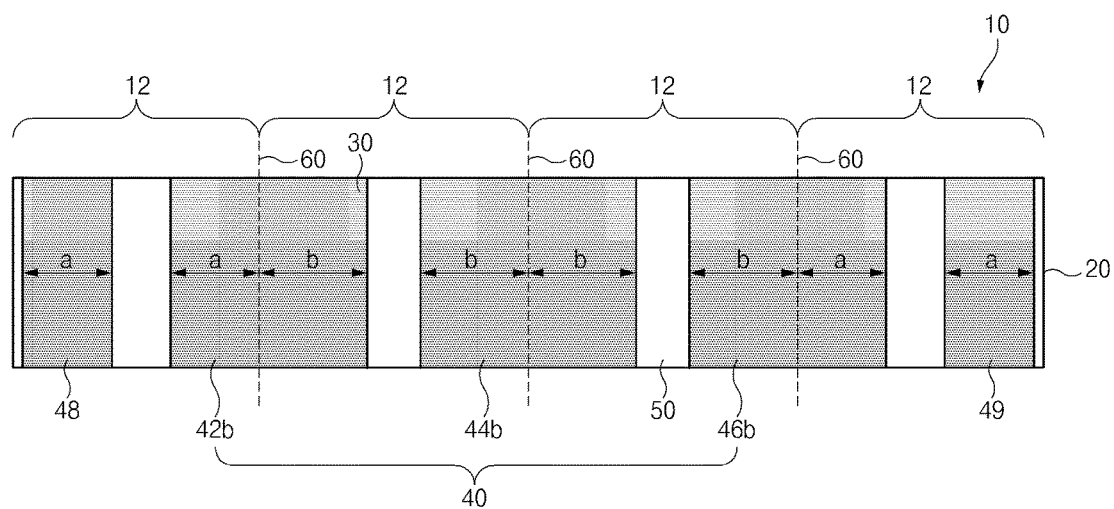
FIG. 4 is a plan view for explaining a coating step and a first cutting step in a method for manufacturing an electrode according to another embodiment of the present invention.

FIG. 4 is a plan view for explaining a coating step and a first cutting step in a method for manufacturing an electrode according to another embodiment of the present invention and illustrates an example of a case in which the coating portions 42b and 46b (i.e., a first coating portion and a third coating portion), each of which has a length of a+b, are repeatedly formed on the collector 20 with the non-coating portion 50 and the coating portion 44b (i.e., the second coating portion) having a length of b+b therebetween.

Also, in the coating step, the electrode active material may be applied to outer portions of the collector to form coating portions having different lengths from the lengths described above. That is, referring to FIGS. 3 and 4, in the coating step, the electrode active material may be applied to one outer portion or both outer portions of the collector 20 to form outer coating portions 48 and 49 having different lengths of a+b or b+b. Here, each of the outer coating portions 48 and 49 may have a length less than that of each of other coating portions 42, 44, and 46. FIGS. 3 and 4 illustrate a case in which outer coating portions 48 and 49, each of which has a length of a, are formed on both outer portions of the collector 20.

In the coating step, the electrode active material 30 may be applied to the collector 20 so that the non-coating portion 50 having same size are repeatedly formed as the coating portions 40 having same size are repeatedly formed.

When the coating step is completed, a first cutting step of producing a middle-stage electrode 12, which is primarily processed, by cutting the initial electrode 10 is performed. FIGS. 3 and 4 illustrate a first cutting line that is a line for cutting the initial electrode 10 in the first cutting step. FIGS. 3 and 4 illustrate a case in which the first cutting line 60 in the first cutting step is defined in a direction perpendicular to that in which the electrode active material 30 is applied in the coating step. However, on the other hand, in the first cutting step, the first cutting line 60 may be defined at a different angle with respect to the direction in which the electrode active material 30 is applied in the coating step. Alternatively, in the first cutting step, the first cutting line 60 may be defined in parallel to the direction in which the electrode active material 30 is applied in the coating step. In the first cutting step, the initial electrode 10 is divided into a plurality of middle-stage electrodes 12.

Here, in the first cutting step, the initial electrode may be cut so that at least one of the plurality of middle-stage electrodes 12 has a length different from those of the other middle-stage electrodes 12. Also, in the first cutting step, the middle-stage electrodes 12 may include a non-coating portion 50 and two coating portions spaced apart from each other by the non-coating portion 50. Here, the coating portions within one middle-stage electrode 12 may have the same length. FIGS. 3 and 4 illustrate examples of the above-described cases, i.e., the middle-stage electrode including the coating portion having a length of a/the non-coating portion/the coating portion having a length of a and the middle-stage electrode 12 including the coating portion having a length of b/the non-coating portion/the coating portion having a length of b. As described above, the a and b may have different values.

In the coating step and the first cutting step, the middle-stage electrodes 12 may be divided into two or more groups according to a length of the coating portion 40. FIGS. 3 and 4 illustrate a case in which the middle-stage electrodes 12 are divided into two groups according to a length of the coating portion 40. However, although not shown, in the coating step and the first cutting step, the middle-stage electrodes may be divided into three or more groups according to a length of the coating portion 40. Here, since the middle-stage electrodes 12 are divided into two or more groups according to a length of the coating portion 40, the coating portions of the middle-stage electrodes 12 of the groups may have different lengths. FIGS. 3 and 4 illustrate a case in which the coating portions of the middle-stage electrodes 12 of the groups have different lengths of a and b.

An arranged order of the middle-stage electrodes 12 of the groups after the first cutting step is performed may be different according to the coating step. That is, as illustrated in FIG. 3, in the coating step, when the coating portions 42a and 44a (i.e., the first coating portion and the second coating portion), each of which has a length of a+b are repeatedly formed on the collector 20 with the non-coating portion 50 therebetween, the initial electrode 10 may be divided into the middle-stage electrode belonging to a first group/the middle-stage electrode belonging to a second group/the middle-stage electrode belonging to the first group after the first cutting step is performed. Alternatively, as illustrated in FIG. 4, in the coating step, when the coating portions 42b and 46b (i.e., the first coating portion and the second coating portion), each of which has a length of a+b are repeatedly formed on the collector 20 with the non-coating portion 50 and the coating portion 44b (i.e., the second coating portion) having a length of b+b therebetween, the initial electrode may be divided into the middle-stage electrode belonging to a first group/the middle-stage electrode belonging to a second group/the middle-stage electrode belonging to a second group/the middle-stage electrode belonging to the first group after the first cutting step is performed.

When the first cutting step is completed, a second cutting step in which the middle-stage electrode is cut to manufacture a final electrode to be used for manufacturing the electrode assembly may be performed. That is, in the coating step according to an embodiment and the other embodiment of the present invention, the first cutting step of manufacturing the middle-stage electrode from the initial electrode coated with the electrode active material on the collector and the second cutting step of manufacturing the final electrode from the middle-stage electrode may be performed to manufacture an electrode assembly having a stepped portion.

Figure 5:
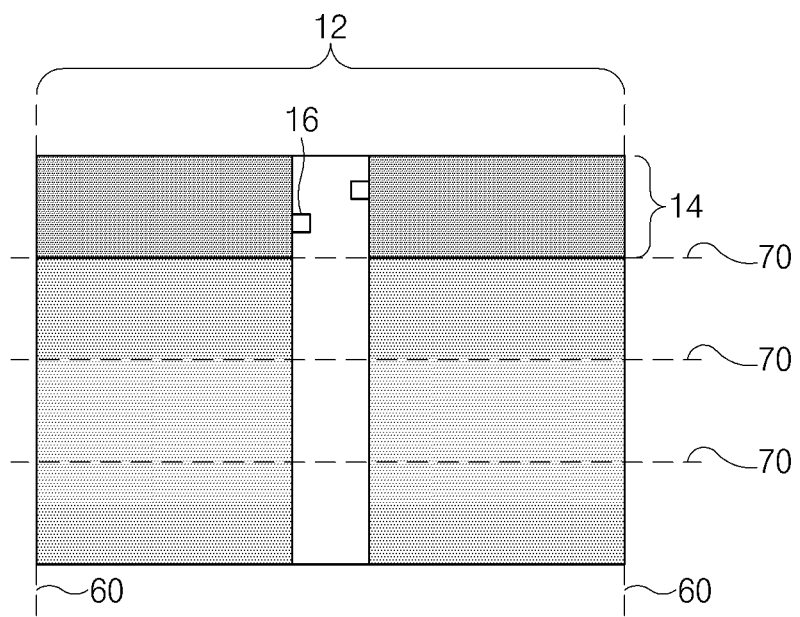
FIG. 5 is a plan view for explaining a second cutting step in the methods for manufacturing an electrode according to an embodiment and another embodiment of the present invention.

FIG. 5 is a view for explaining the second cutting step in the methods for manufacturing the electrode according to an embodiment and another embodiment of the present invention.

The middle-stage electrode 12 illustrated in FIG. 5 may be the middle-stage electrode manufactured from the initial electrode in the first cutting step, and thus, the middle-stage electrode 12 illustrated in FIG. 5 may have a length of a or b.

FIG. 5 illustrates a second cutting line 70 that is a line for cutting the middle-stage electrode 12 in the second cutting line like the first cutting line. Here, the second cutting line 70 may be perpendicular to the first cutting line. However, the present invention is not limited thereto. For example, the second cutting line may have a predetermined angle with respect to the first cutting line.

The second cutting step may include a step of cutting a portion of the non-coating portion of the middle-stage electrode 12 to manufacture the final electrode having an electrode tab. That is, as illustrated in FIG. 5, the second cutting step may include a step of cutting a portion of the non-coating portion so that the portion of the non-coating portion becomes to the electrode tab 16 of the electrode 14. A plurality of final electrodes 14 may be manufactured from the middle-stage electrode 12 through the second cutting step. Hereinafter, an apparatus for manufacturing an electrode according to an embodiment of the present invention will be described.

Apparatus for Manufacturing Electrode

An apparatus for manufacturing an electrode according to an embodiment of the present invention may includes: a coating unit for applying an electrode active material to one surface or both surfaces of a collector to manufacture an initial electrode; and a first cutting unit for cutting the initial electrode coated with the electrode active material to manufacture a plurality of middle-stage electrodes. Here, in the first cutting unit, the initial electrode may be cut so that at least one of the plurality of middle-stage electrodes has a length different from those of the other middle-stage electrodes.

Also, in the coating unit and the first cutting unit, the middle-stage electrode may include a coating portion that is an area coated with the electrode active material and a non-coating portion that is an area which is not coated with the electrode active material so that the coating portions are spaced apart from each other, and, the coating portions within the middle-stage electrode may have the same length by the coating unit and the first cutting unit.

In the coating unit and the first cutting unit, the middle-stage electrode may be divided into two or more groups according to lengths of the coating portions. Here, the coating portions of the middle-stage electrodes of the groups may have lengths different from each other.

In the coating unit, the electrode active material may be applied to the collector so that the initial electrode includes the non-coating portion that is the area which is not coated with the electrode active material and the coating portions that are areas coated with the electrode active material and spaced apart from each other. Also, the coating unit may apply the electrode active material so that the coating portions having the same length are repeatedly disposed.

The apparatus for manufacturing the electrode according to an embodiment of the present invention may further include a second cutting unit for cutting the middle-stage electrode to manufacture a final electrode. Here, a cutting direction of the second cutting unit may be perpendicular to that of the first cutting unit.

Also, the second cutting unit may cut a portion of the non-coating portion of the middle-stage electrode so that the final electrode includes an electrode tab.

While the embodiments of the present invention have been described with reference to the specific embodiments, it will be apparent to those skilled in the art that various changes and modifications may be made without departing from the spirit and scope of the invention as defined in the following claims.

The invention claimed is:

1. A method for manufacturing an electrode, the method comprising:

a step of preparing a collector;

a coating step of applying an electrode active material to one surface or both surfaces of the collector to manufacture an initial electrode; and a first cutting step of cutting the initial electrode coated with the electrode active material to manufacture a plurality of middle-stage electrodes, wherein each of the middle-stage electrodes comprises two coating portions that are areas coated with the electrode active material and a non-coating portion that is an area which is not coated with the electrode active material, the coating portions are spaced apart from each other, wherein, in the first cutting step, the initial electrode is cut so that for at least one of the plurality of middle-stage electrodes, the two coating portions have an overall length that is different than an overall length of two coating portions for at least one other middle-stage electrode, and wherein, in each of the middle-stage electrodes, each of the two coating portions has a same length.

2. The method of claim 1, wherein the plurality of middle-stage electrodes are divided into two or more groups according to lengths of the coating portions, and the coating portions of the middle-stage electrodes of the groups have lengths different from each other.

3. The method of claim 1, wherein, in the coating step, the electrode active material is applied so that the initial electrode comprises the non-coating portion that is the area which is not coated with the electrode active material and the coating portions that are areas coated with the electrode active material and spaced apart from each other, and the electrode active material is applied so that the coating portions having the same length are repeatedly disposed.

4. The method of claim 1, further comprising a second cutting step of cutting the middle-stage electrode to manufacture a final electrode.

5. The method of claim 4, wherein a cutting direction in the first cutting step is perpendicular to that in the second cutting step.

6. The method of claim 4, wherein, in the second cutting step, a portion of the non-coating portion of the middle-stage electrode is cut so that the final electrode comprises an electrode tab.

* * * * *